United States Patent

Tomita et al.

[11] 4,052,798
[45] Oct. 11, 1977

[54] AUDIO-VISUAL TEACHING SYSTEM

[75] Inventors: Shinji Tomita, Zushi; Tsunehiro Kashima, Yamato, both of Japan

[73] Assignee: Sony Corporation, Tokyo, Japan

[21] Appl. No.: 672,970

[22] Filed: Apr. 2, 1976

[30] Foreign Application Priority Data

Apr. 8, 1975 Japan .................................. 50-42528

[51] Int. Cl.$^2$ ............................................... G09B 7/04
[52] U.S. Cl. ..................................................... 35/9 A
[58] Field of Search ......................... 35/9 A, 8 R, 8 A

[56] References Cited

U.S. PATENT DOCUMENTS

| | | | |
|---|---|---|---|
| 3,277,588 | 10/1966 | Lynott et al. ........................... | 35/9 A |
| 3,654,708 | 4/1972 | Brudner .................................. | 35/9 A |

*Primary Examiner*—William H. Grieb
*Attorney, Agent, or Firm*—Lewis H. Eslinger; Alvin Sinderbrand

[57] ABSTRACT

A system for selectively supplying information including video information to operators, such as students, at plural stations, the information requiring responses, or answers, and the correctness of each operator's answer being displayed. A television monitor is provided at each station to display video picture information. In reply to a question, which may be displayed or audibly reproduced, a responding device is selectively operated by the operator. The video picture information displayed at each television monitor is stored in a main storage device in the form of video picture signals representing predetermined still video information. Selected ones of the video picture signals are supplied from the main storage device as a function of each response, or answer, by the operators. A buffer store having a plurality of video picture signals storage channels corresponding to the number of stations is coupled to the main storage device to receive the selected video picture signals and to transmit these received signals to particular ones of the stations. A control unit is coupled to the main storage device and to the buffer store for controlling the transmission of selected video picture signals from the main storage device to a particular video picture signal storage channel and for controlling the transmission of video picture signals from the storage channels in the buffer store to selected ones of the stations.

In one embodiment, a video display of the correctness of the operator's answer is provided. It is one feature of this system to transmit new video information to each monitor in accordance with the pace, or progress, of each operator.

19 Claims, 7 Drawing Figures

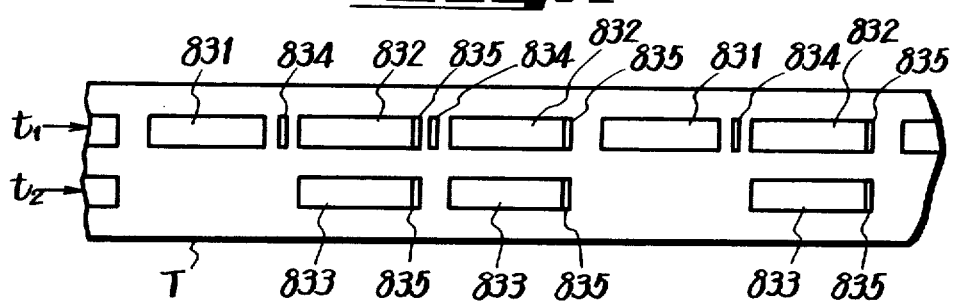
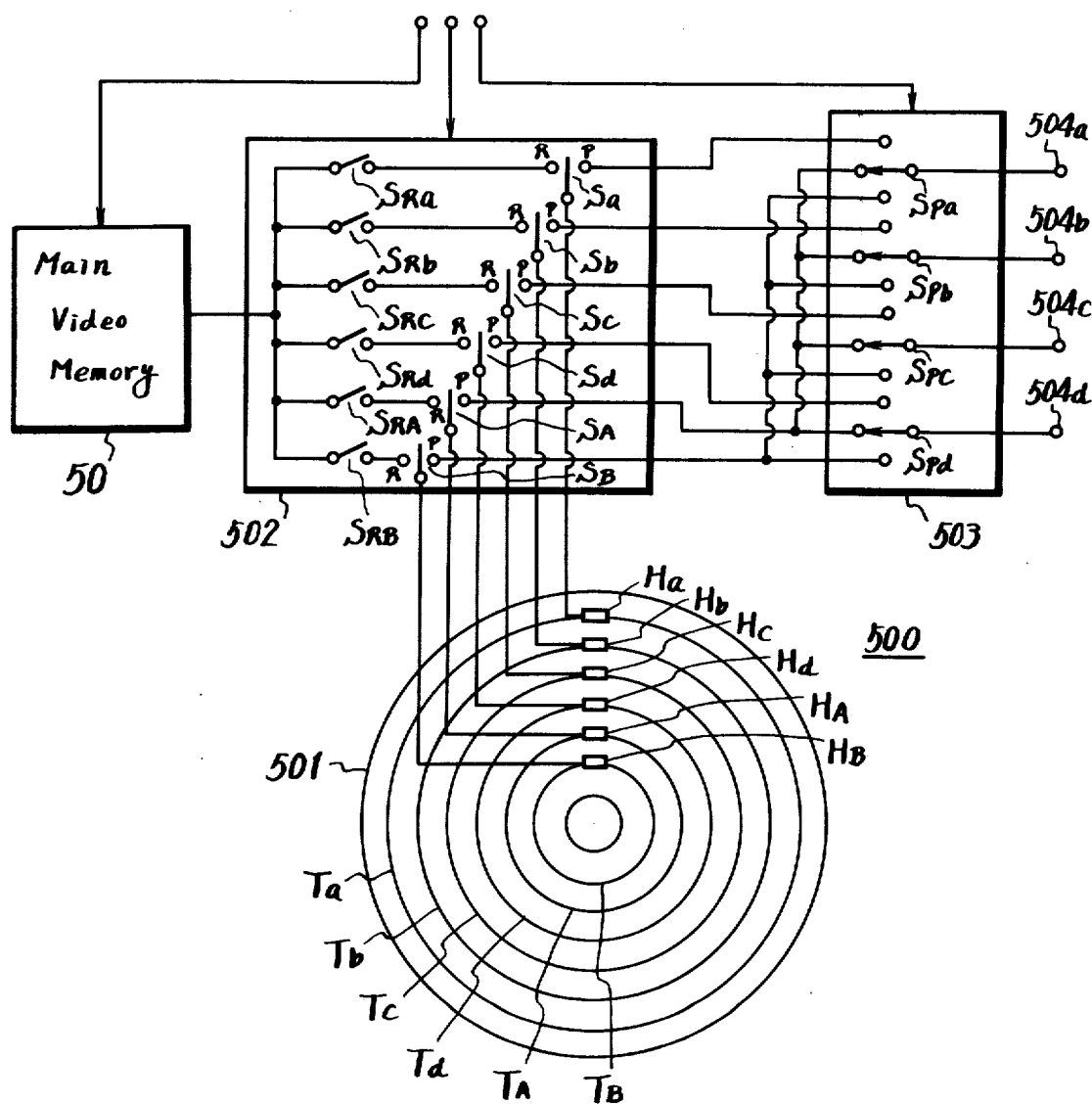

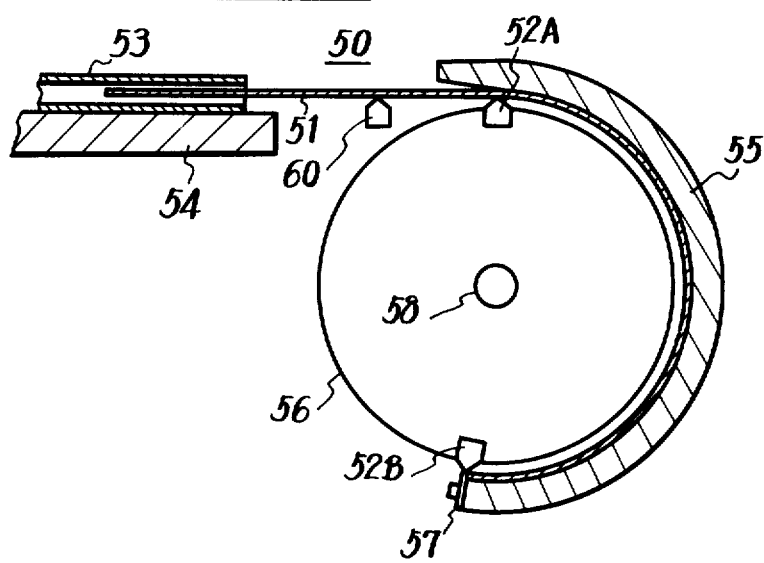
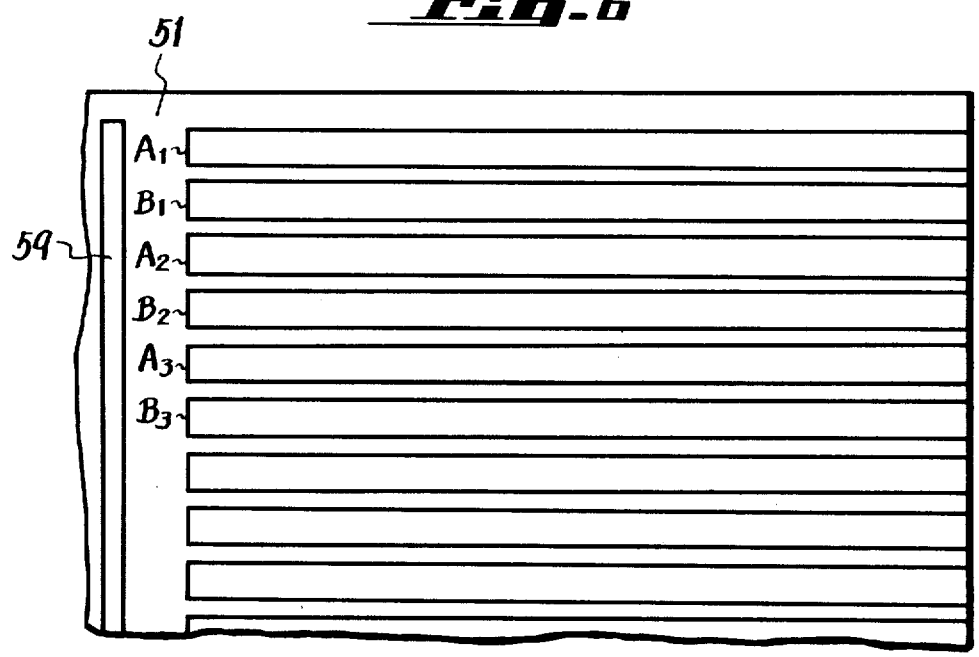

AUDIO-VISUAL TEACHING SYSTEM

BACKGROUND OF THE INVENTION

This invention relates to an audio-visual teaching system and, more particularly, to such a system wherein visual information is displayed on an individual television monitor provided at each of a plurality of operator, or student, stations and wherein each television display is changed as a direct function of the progress of the operator.

In a typical audio-visual teaching system, a slide projector generally is used as the source of visual information, this slide projector being common to all students. Each student is provided with audio information reproduced from a record medium, such as magnetic tape, or the like, and each student's response is detected. The entire system is controlled by a central control means, or central processing unit, whereby each student's response to, for example, audible questions which relate to the visual information is evaluated. Once one question, or set of questions, relating to a particular topic shown in the visual information is completed, the next topic or matter under consideration is examined.

Unfortunately, in the typical prior art system of the aforenoted type, those students who are capable of rapidly progressing must await the ultimately correct answering of the other students. That is, the displayed visual information cannot be advanced, or changed, until all students favorably answer the questions pertaining to the instantaneous display. This, of course, tends to penalize those students having a faster learning ability. Alternatively, the visual information, and thus the rate of instruction, can be advanced when a certain number of students successfully answer the questions. Although this is to the advantage of those who are quick to learn, the remaining students having a slower learning ability will suffer.

Accordngly, it is thought that these basic defects in a centralized audio-visual teaching system can be overcome by providing separate visual displays for each of the students. However, this requires a duplication of, for example, slide projectors and individual photographic slides. This redundancy in apparatus is accompanied by higher costs.

OBJECTS OF THE INVENTION

Therefore, it is an object of the present invention to provide an improved audio-visual teaching system and method.

It is another object of the present invention to provide an improved system and method for selectively supplying independent information to a plurality of stations whereat operators, or students, at each station provide independent responses, or answers.

Yet another object of this invention is to provide an improved audio-visual teaching system and method wherein visual information is displayed on a television monitor provided at each student station.

Yet another object of this invention is to provide an audio-visual teaching system and method which includes a television monitor for each student and wherein each student receives instruction and progresses pursuant to such instruction substantially independently.

An additional object of this invention is to provide an improved audio-visual teaching system and method wherein instruction is provided by visually displaying information on a television monitor and audibly producing audio information on audio signal reproducing apparatus, each student being provided with an individual television monitor and an individual audio signal reproducer.

Various other objects, advantages and features of this invention will become apparent from the ensuing detailed description, and the novel features will be particularly pointed out in the appended claims.

SUMMARY OF THE INVENTION

In accordance with the present invention, an audio-visual teaching system is provided with a plurality of stations whereat operators or students, provide independent responses to information supplied thereat, each station including a television monitor for displaying video picture information; a manually operable responding device for producing a response by the operator, or student; a main storage device for storing a plurality of video picture signals, each such video picture signal representing a predetermined still video information, and selected ones of the video picture signals are supplied to the particular stations as a function of each operator's response; a buffer store having a number of video picture storage channels corresponding to the number of operator stations and being coupled to the main storage device to receive the selected video picture signals and to transmit the received signals to particular ones of the stations; and a control unit coupled to the main storage device and to the buffer store to control the transmission of a selected video picture signal to a particular video signal storage channel and to control the further transmission of the stored video picture signals to the selected stations.

In accordance with one aspect of this invention, audio signal information, such as an explanation and a question, is reproduced at each station by an associated audio signal reproducing device. If, in reply to the audio information, the operator effects correct response, instruction proceeds and another video picture is displayed together with the reproduction of associated audio information and questions. However, in the event that the operator'response is incorrect, further audio information pertaining to the displayed video picture is reproduced and the audio signal reproducing apparatus reproduces a further question which requires a response by the operator. Hence, while one operator, or student, may proceed in a relatively rapid manner, another operator, or student, may proceed with this instruction at a relatively slower rate.

BRIEF DESCRIPTION OF THE DRAWINGS

The following detailed description, given by way of example, will best be understood in conjunction with the accompanying drawings in which:

FIG. 4 is a schematic plan view of a portion of the magnetic recording tape which can be used in the audio signal reproducing apparatus of FIG. 1;

FIG. 5 is a schematic view of a portion of the main storage device used with the present invention;

FIG. 6 is a plan view of a portion of the magnetic recording medium used with the main storage device of FIG. 5; and FIG. 7 is a schematic diagram showing one example of a buffer store which can be used with the present invention.

DETAILED DESCRIPTION OF A CERTAIN PREFERRED EMBODIMENT

Figure 1:
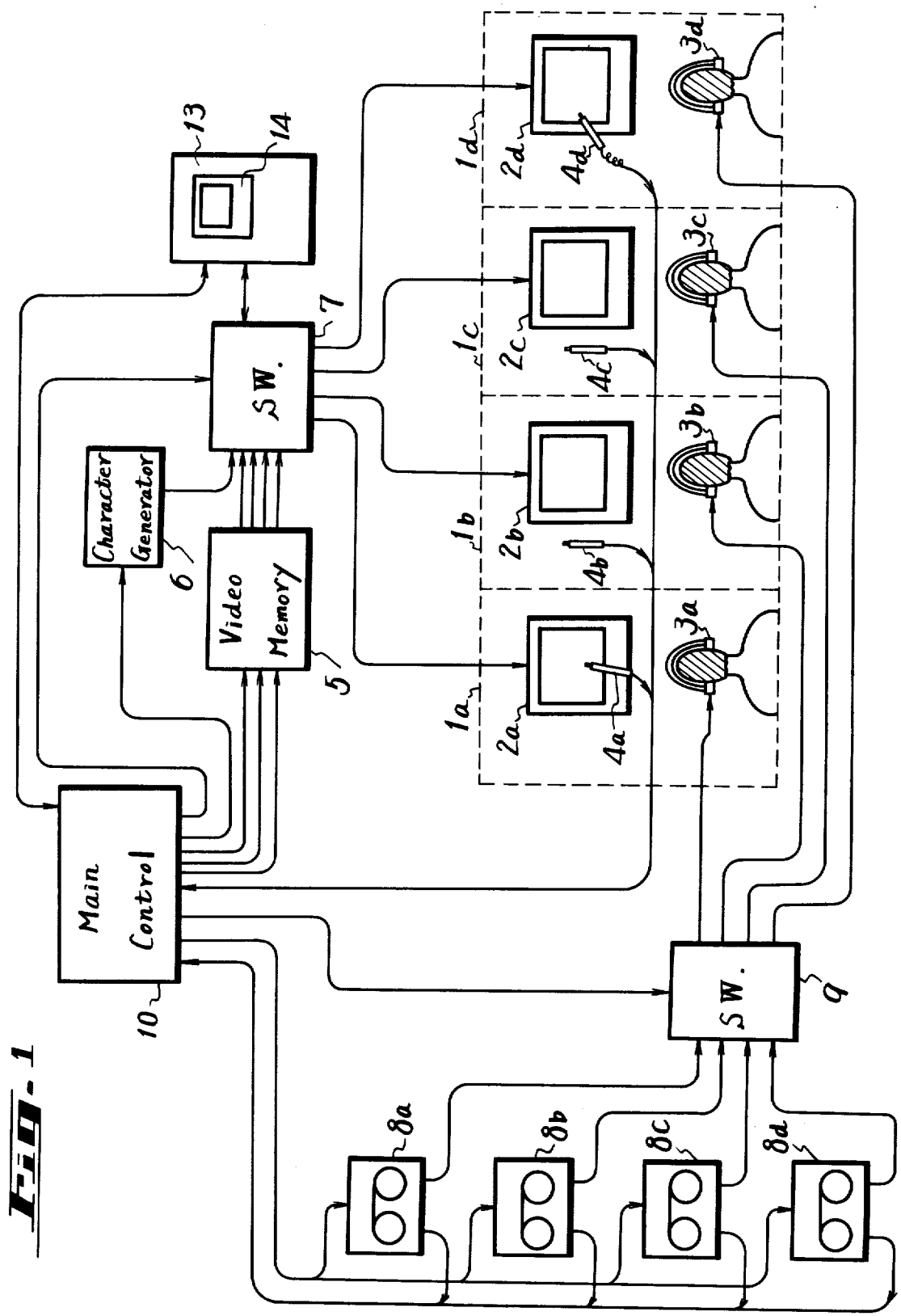
FIG. 1 is a block diagram of the overall system.

Referring now to the drawings, wherein like reference numerals are used throughout, and in particular to FIG. 1, there is shown a block diagram of the overall system of the present invention. Conveniently, separate stations 1a, 1b, 1c and 1d are provided for each operator, or student, whereat visual and audio information is presented and to which each student must respond. Typically, each station may be a separate booth which, additionally, may be sound-proofed to facilitate concentration. A television monitor 2a, 2b, 2c and 2d is provided at each station to provide the visual display of video picture information. Also, headphones 3a, 3b, 3c and 3d, or other sound transducing devices, are provided at each station to reproduce the audio information associated with the displayed video picture for each student. As will soon be described, this audio information may comprise an explanation of the video picture and, additionally, one or more questions concerning the displayed video picture which are designed to test the student's understanding and comprehension.

Preferably, each student's reply is manifested by operation of a light pen 4a, 4b, 4c and 4d. That is, the audio question may require that the student touch, or juxtapose, his light pen adjacent a displayed character which the student believes represents the correct answer to the question. The signal produced by the light pen which represents the student's answer then is evaluated to determine its correctness.

The video picture information displayed at each television monitor 2a, 2b, 2c and 2d is in the form of a still picture. As is known, the still video picture is comprised of a frame of video information which is represented by a video signal having horizontal synchronizing, or scanning, information interspersed with line information. The composite signal is formed of a multiple of lines which constitutes a raster. Since each displayed video picture is a still picture, only one frame of information need be provided. Hence, a multiplicity of frames of information is stored in a video memory 5. In an embodiment to be described, video memory 5 is comprised of a magnetic record sheet having the multiplicity of frames recorded in individual tracks thereon. As each track is scanned by magnetic reproducing apparatus, the pre-recorded frame of video signals is reproduced and ultimately transmitted to particular ones of the televison monitors. If desired, each frame of video signal information can be divided into two fields, the fields being recorded on separate tracks. Hence, the still picture is reproduced by scanning both fields which constitute the displayed frame.

As shown, the video memory 5 is coupled to each television monitor 2a, 2b, 2c and 2d by a switching circuit 7. An additional input to switching circuit 7 is provided by a character generator 6. Character generator 6 may comprise a dynamic or static storage device having predetermined character signals stored therein. These character signals correspond to an alphanumeric array which is to be displayed on each of the television monitors. As is appreciated, this alphanumeric array represents the possible answers to a question to which a student must respond.

A separate audio signal reproducing device 8a, 8b, 8c and 8d is provided at each station 1a, 1b, 1c and 1d, respectively. In one embodiment thereof, each audio signal reproducing device is constituted by a magnetic tape reproducer. However, other devices having audio information pre-recorded on a suitable record medium can be used. The outputs of the respective tape reproducers are supplied through a switching circuit 9 to corresponding headphones 3a, 3b, 3c and 3d. Hence, the audio information pre-recorded on the magnetic tape is independently reproduced for each student. As aforesaid, this audio information may comprise an audible explanation of the displayed video picture followed by one or more questions relating thereto. In addition, and as will be described in greater detail hereinbelow, the tape may be provided with predetermined control signals which are used to represent the relative progress, or advance, of the student, as well as other control signals which are used in conjunction with the student's response to control further instruction and video picture display.

A main control unit 10 is provided to select the particular frame of video picture information which is to be displayed at each television monitor, to control the advance of each tape reproducing device, to evaluate the response of each student, as manifested by the position of each light pen, and to initiate operation of character generator 6. Hence, main control unit 10 may comprise a specially programmed general purpose computer, a special purpose computer, or various gate and switching circuits well known to those of ordinary skill in the art.

Figure 2:
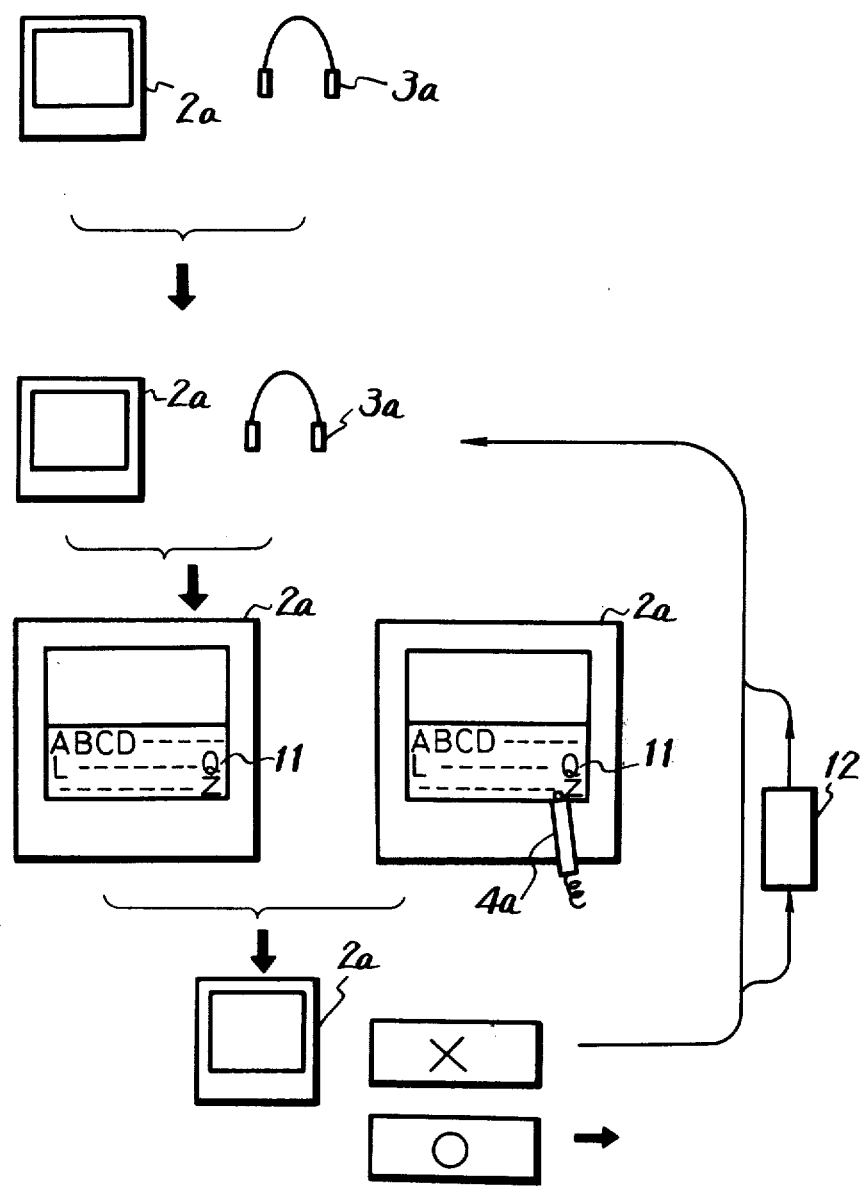
FIG. 2 is a schematic illustration of the manner in which instruction proceeds in accordance with the system of FIG. 1.

The manner in which the system illustrated in FIG. 1 is used in a course of instruction is schematically depicted in FIG. 2. Initially, and as will be described in greater detail below, a student at, for example, station 1a, is presented with a visual display on television monitor 2a. This visual display is a frame of video information transmitted to the television monitor from video memory 5. Associated with this display is audio information reproduced by tape reproducing device 8a and detected at headphones 3a. Typically, the audio information may be a description of the visual display and, additionally, may relate various salient points necessary for instruction.

Then, following this description, one or more questions may be asked. Typically, this can be provided by a pre-recorded question block following an explanation block on the magnetic tape. The question is intended to elicit a response by the student. In this regard, character generator 6 may be activated to supply an alphanumeric display 11 to television monitor 2a. This display may correspond to various alternative possible answers, only one of which being correct, to the presented question. As one example, each possible answer may be audibly reproduced, and the prefix to each answer, such as (a) . . . , (b) . . . , is the alphanumeric display 11. The student then selects his answer by juxtaposing light pen 4a in respect to the particular alphanumeric character which he believes represents the correct answer. As one example, the light pen may be placed on the surface of the display screen of television monitor 2a in overlying relation to the alphanumeric character corresponding to the prefix of the answer selected by the student.

The position of light pen 4a in respect to alphanumeric dislay 11 is detected, and this detected position represents the student's answer. Hence, the student's answer is compared to the correct, or predetermined, answer. In the event that the student's answer is correct, a suitable indication thereof may be provided on the display screen of television monitor 2a. For example, the immediately preceding video picture can be replaced by a predetermined picture representing a correct answer. Alternatively, the correct answer representation may be superimposed over the displayed picture. In any event, a correct answer results in advancing the magnetic tape to the next set of information, or instruction, and also results in an associated new video picture to be transmitted from video memory 5 to television monitor 2a. The foregoing process then is repeated.

However, if the student's answer is not correct, that is, if the position of light pen 4a does not coincide with the position of the prefix of the correct answer, an appropriate visual display is provided. For example, if main control unit 10 detects the incorrect answer, a predetermined frame of video information representing an incorrect answer is transmitted from video memory 5 to televison monitor 2a. Also, the next set of information, or instruction, is not reproduced. Rather, further explanatory information previously recorded on the magnetic tape is reproduced and either the previous question is repeated or a further, pre-recorded question is reproduced. The student then has another opportunity to answer this question. The block 12 represents the reproduction, or presentation, of further explanatory information to the student. If the student now answers the question correctly, the aforenoted display of a correct answer is provided and the student advances to the next set of instructional information. However, if the student again selects an incorrect answer, the foregoing procedure wherein further explanatory information and another question are presented, is repeated.

While the foregoing has described the manner in which instructional information is presented to a student at station 1a and the manner in which that student responds a similar process is performed at each of the remaining stations 1b, 1c and 1d. However, as will be described, each of these instructional processes is substantially independent of the others. That is, each station has the capability of permitting the student to advance, or proceed, at his own pace. Hence, the visual and audio information presented at station 1a may be entirely different from that which then is presented at, for example, station 1b, 1c or 1d.

The manner in which light pen 4a is used to select an answer now will be described. The light pen is provided with a photosensitive element adapted to produce an output signal when light impinges thereon. Suitable threshold circuitry may be provided such that the light pen output signal is produced only when impinging light exceeds a pre-settable threshold. When light pen 4a is positioned on the surface of the viewing screen of television monitor 2a, light of sufficient intensity will be received by the light pen when the scanning electron beam excites the luminescent particles on the viewing screen in the immediate area of the light pen. Thus, as the electron beam scans the entire area of the viewing screen, an output signal is produced by light pen 4a when the electron beam reaches the XY coordinate of the light pen location. Now, if the scanning of the electron beam is tracked so that substantially all XY coordinates of the instantaneous beam position are followed, the particular XY coordinate defining the light pen location will be identified when the light pen produces its output signal. Once the light pen location is known, it follows that the predetermind alphanumeric character dislayed at such location also is known. Hence, the student's answer, which is manifested by his positioning of the light pen at a particular alphanumeric character, is detected. The answer, or response, then is compared to the predetermined response to evaluate the correctness of the student's answer.

Various known techniques can be used to track the scanning of the electron beam through all XY coordinates across the surface of the viewing screen. For example, a first counter can be incremented in synchronism with the horizontal deflection generator to thereby produce representations of successive X coordinates. Similarly, a second counter can be incremented in synchronism with the vertical deflection generator to thereby produce representations of the successive Y coordinates. The instantaneous counts exhibited by these respective counters thus represent the instantaneous XY coordinate of the scanning electron beam. The location of light pen 4a thus is determined by sensing and X and Y counts when the light pen produces its output signal.

The manner is which instructions are presented to each student via the tape reproducing apparatus 8a, 8b, 8c and 8d will be described with specific reference to the schematic representation of the magnetic tape T, illustrated in FIG. 4. It should be appreciated that tape T is similar for each tape reproducing apparatus, although the specific pre-recorded information on each tape may vary from station to station and, thus, from student to student. The tape preferably is comprised of two information tracks $t_1$ and $t_2$, track $t_1$ being the main track and track $t_2$ being the secondary track. The pre-recorded information on tracks $t_1$ and $t_2$ are reproduced by conventional pick-up heads and the reproduced audio information is supplied to the headphones, such as headphones 3a at station 1a. In addition, pre-recorded control signals are sensed and supplied to the main control unit for effecting control over the movement of tape T and the selection and transmission of video picture information.

Initially, the pre-recorded information on track $t_1$ is sensed. An information segment or block 831 may be, for example, explanatory information presented to the student and associated with the video picture then being displayed by, for example, television monitor 2a. A picture address signal may be encoded in advance of block 831 or, alternatively, at an initial portion of block 831 or, as a further alternative, the picture address signal may be superimposed over the audio information signal included in block 831. The purpose of the picture address signal is to identify the particular video picture information signal which is stored in video memory 5 and which is to be displayed at television monitor 2a. Hence, this picture address signal is sensed and transmitted to main control unit 10 whereat the address signal is decoded and used to select the corresponding video picture information signal stored in video memory 5 to be read out, or transmitted, to television monitor 2a. Hence, it is seen that the picture address signal may comprise a digitally coded address, or the like. Consequently, as tape T is advanced, the audio information included in block 831 is reproduced at headphones 3a and the video picture associated therewith is displayed at television monitor 2a. Accordingly, the student is provided with explanatory material concerning the picture which he is viewing.

At the conclusion of block 831, a cue signal 834 is detected, for a purpose soon to be described, and then the next segment, or block of information 832, is sensed and transmitted to headphones 3a. As one example thereof, the block of information 832 may be one or more questions pertaining to the subject matter previously explained in block 831. The question presented by block 832 may relate to the video picture information which the student had been viewing or, alternatively, may be related to a different video picture concerned with the same subject matter. To this effect, another picture address signal may be provided with block 832 to thereby enable a suitable video picture to be read out, or transmitted, from video memory 5 to television monitor 2a. The selection and readout of such a video picture is performed under the control of main control unit 10, as aforesaid.

At the conclusion of block 832, a stop signal 835 is detected. This signal may be transmitted to main control unit 10 whereat the stop signal is sensed and tape reproducing apparatus 8a is controlled to temporarily halt further movement of tape T. While the tape is temporarily stopped, the student has an opportunity to answer, or respond, to the question presented in block 832. As discussed above, the student's response is manifested in the selective positioning of light pen 4a at a particular location juxtaposed a selected alphanumeric character displayed by television monitor 2a in response to the predetermined character array produced by character generator 6. If the student's response, or answer, is correct, that is, if it is the predetermined answer, as determined by main control unit 10, then tape reproducing apparatus 8a is controlled to resume the movement of tape T. Hence, a cue signal 834 is detected, for a purpose soon to be described, and another block of information 832 then is sensed. As one example, this block 832 may be another question associated with the video picture then displayed or, alternatively, may be yet another block of explanatory material. In yet another embodiment, this successive block 832 may pertain to a different video picture and, therefore, may be provided with a corresponding picture address signal to effect the readout from video memory 5 to television monitor 2a of the appropriate video picture information. In yet a futher embodiment, this successive block 832 may be avoided, or skipped, if the student had answered the previous question correctly. For example, main control unit 10 may mute tape reproducing apparatus 8a while tape T is advanced from cue signal 834 to the next succeeding stop signal 835 if the previous answer had been correct.

In the event that the answer manifested by the selective location of light pen 4a on the display screen of television monitor 2a is not correct, as determined by main control unit 10,, then tape T is not advanced. Rather, after displaying an indication of the incorrectness of the answer, as aforesaid, main control unit 10 activates tape reproducing apparatus 8a to move the tape T in the reverse direction. As will soon be described, suitable control circuitry is provided to sense when tape T has been reversed to the initial, or start position, of the immediately preceding block 832. Then, main control unit 10 controls tape reproducing apparatus 8a to drive tape T in the forward direction. Also, the pick-up head (or heads) in tape reproducing apparatus 8a are controlled such that the pre-recorded information in track $t_2$ is reproduced. This control may be effected by, for example, a main pick-up head and a secondary pick-up head aligned with main track $t_1$ and secondary track $t_2$, respectively. The main head normally may be activated; but when tape T is reversed, the secondary head is activated to pick up, or reproduce, the information located on secondary track $t_2$.

Thus, as tape T again is moved in the forward direction, the segment, or block, of information 833 in secondary track $t_2$ is reproduced. As one example thereof, block 833 may comprise further explanatory material to provide an additional explanation or instruction to the student. If desired, a video picture address signal may be associated with block 833 such that different video picture information may be displayed while this further explanatory material is presented. It is appreciated that the initial, or starting, position of block 833 is aligned with the initial, or starting, position of block 832. The reason for this alignment soon will become apparent.

At the conclusion of reproducing block 833, a prerecorded stop signal 835 is detectecd, resulting in the control by main control unit 10 of tape reproducing apparatus 8a to temporarily stop tape T. At this time, the pick-up head, or heads, are activated such that information recorded on main track $t_1$ is reproduced. Following this activation of the heads, main control unit 10 applies a suitable control signal to tape reproducing apparatus 8a to resume forward movement of tape T. Hence, the next successive block 832 is reproduced, thereby presenting another question pertaining to the displayed video picture information. At the conclusion of this succeeding block 832, stop signal 835 is detected, resulting in temporarily halting further movement of tape T. The student now has an opportunity to respond to the last question by selectively positioning light pen 4a at an appropriate location. If this location of light pen 4a represents a correct answer, a suitable video display thereof is provided, and tape T is advanced so that the next block 831 of explanatory information is reproduced. However, if the student's answer to this last question also had been incorrect, main control unit 10 controls tape reproducing apparatus 8a to reverse the direction in which tape T is moved until the initial, or start, position of this second block 832 is reached. At that time, a further explanatory block 832 on secondary track $t_2$ is reproduced. If desired, the final portion of this additional explanatory block 833 may be provided with a question requiring a correct response by the student in order for the instruction process to proceed. As is also apparent, various modifications of the information prerecorded in blocks 831 and 832 and 833 may be effected, as desired. For example, rather than providing additional explanatory information, block 833 merely may be a series of pre-recorded elementary questions. Similarly, the two blocks 832 in main track $t_1$ may be provided with identical pre-recorded questions. Of course, various additional permutations of the foregoing are envisaged.

To summarize, as tape T is advanced in tape reproducing apparatus 8a, audio information is reproduced and, concurrently therewith, an associated video picture is displayed. This video picture may be identified by a picture address associated with, or superimposed upon, the pre-recorded audio information. This picture address is detected by main control unit 10 to select the appropriate frame of picture information signals in video memory 5 to be read out and displayed at television monitor 2a.

Since each station 1a, 1b, 1c and 1d is provided with an individual tape reproducing apparatus 8a, 8b, 8c and 8d, respectively, and since the movement of tape T through the tape reproducing apparatus controls the speed and progress of the instruction process, it is appreciated that each student may proceed indpendently of the others, and at a learning rate which is particularly adapted for his capabilities. This advantageous feature will become readily apparent from the forthcoming description.

The manner in which the tape reproducing apparatus is controlled now will be described with reference to the tape control circuitry schematically illustrated in FIG. 3. The tape reproducing apparatus may be of the reel-to-reel type, the endless loop type or the cassette type. Of course, various alternative record media may be used, such as a magnetic belt, a magnetic disc, or the like. In any event, as the tape or medium is advanced, a motion indicator 81 is driven. For example, motion indicator 81 may comprise a rotary element, such as a ring, having magnetic material thereon. Motion detector 81 may be mechanically coupled to the tape supply reel, and thus rotatable therewith. Alternatively, motion detector 81 may comprise a chopping disc adapted to periodically interrupt a light beam. For the embodiment wherein motion detector 81 is a magnetic element, a reed relay 82 is provided, the contacts of reed relay 82 being periodically opened and closed in direct relation with the changing magnetic force exerted thereon by the rotation of element 81.

Relay 82 is connected in series with a resistor 83 between a source of operating voltage $+V_{cc}$ applied to a power supply terminal 84 and a reference level, such as ground. The junction defined by relay 82 and resistor 83 is coupled to the base electrode of a transistor 86 by a resistor 85. A parallel circuit formed of a capacitor 87 and a resistor 88 is connected between the base and emitter electrodes of transistor 86. A collector load resistor 89 couples the transistor collector electrode to power supply terminal 84. Thus, as element 81 rotates, relay 82 is periodically opened and closed, thereby periodically rendering transistor 86 conductive and non-conductive. This, in turn, process corresponding pulse signals at the collector electrode of transistor 86.

The signals produced at the collector electrode of transistor 86 are coupled by a resistor 810 to a Schmidt trigger 811. Schmitt trigger 811 provides pulse shaping and supplies the shaped pulses corresponding to the rotation of member 81 to a bidirectional, or up/down, counter 816. Counter 816 is comprised of plural stages represented, for example, by stages 816a, 816b and 816c. Each stage includes a count-up input and a count-down input to receive pulses respectively adapted to increment and decrement the counts attained by the counter stages. When stage 816a counts up, stages 816b and 816c likewise count up; and when stage 816a counts down, stages 816b and 816c likewise count down. As shown, the count-up input of stage 816a is coupled through a NAND gate 812 to Schmidt trigger 811. Similarly, the count-down input of counter stage 816a is connected through NAND gate 813 to Schmidt trigger 811. NAND gates 812 and 813 are complementarily driven by an up/down control signal applied to an input terminal 814. More particularly, input terminal 814 is connected directly to NAND gate 812 and is connected through a logical inverter 815 to NAND gate 813. For the purpose of illustration, a count-up signal is represented as a binary "1" which, for example, may correspond to a relatively higher voltage signal; and a count-down signal is represented as a binary "0" which, for example, may be relatively lower voltage signal. A count-up binary "1" applied to input terminal 814 conditions NAND gate 812 to transmit the pulses received from Schmidt trigger 811 to counter stage 816a such that counter 816 increments its count in response to each pulse. Conversely, a count-down binary "0" serves to inhibit NAND gate 812 and is inverted by inverter 815 to a binary "1" to condition NAND gate 813 such that the pulses produced by Schmidt trigger 811 are transmitted through NAND gate 813 to the count-down input of counter stage 816a, thereby decrementing the count of counter 816.

An additional input 817 is coupled to the reset terminal of each counter stage 816a, 816b and 816c. A cue signal, such as the aforedescribed cue signal 834 recoreded on tape T in FIG. 4, is adapted to be supplied to reset input 817.

The contents of each counter stage 816a, 816b and 816c are coupled to individual inputs of respective NOR gates 818a, 818b and 818c, the outputs of these NOR gates being coupled through a NAND gate 819 to a monostable multivibrator 820. Each NOR gate 818a, 818b and 818c will produce a binary "1" only when a binary "0" is supplied to each NOR gate input. That is, when a counter stage 816a, 816b or 816c is decremented to a count of zero, this count will be indicated by a binary "1" produced by the corresponding NOR gate 818a, 818b or 818c, respectively. When the full count of counter 816 is reduced to zero, a binary "1" is supplied to each input of NAND gate 819, resulting in a binary "0" supplied to monostable multivibrator 820. This, in turn, triggers the monostable multivibrator to supply a pulse of predetermined duration to output terminal 821.

The manner in which the tape reproducing apparatus control circuit of FIG. 3 functions to control the movement of tape T during an instruction process now will be explained. Let it be assumed that tape T is to be advanced such that block of information 831 is reproduced. Main control unit 10 (FIG. 1) applies a suitable forward drive control signal to the tape reproducing apparatus and, in addition, applies a binary "1" to input terminal 814. Hence, as tape T is advanced, member 81 rotates to periodically open and close the contacts of reed relay 82, thereby supplying Schmidt trigger 811 with pulse signals. Consequently, Schmidt trigger 81 applies pulses through conditioned NAND gate 812 to counter 816. It is appreciated that the count exhibited by counter 816 is directly related to the amount of tape T which has been advanced.

When tape T advances to the point where cue signal 834 is reproduced, this cue signal is applied to reset input terminal 817 to reset each of counter stages 816a, 816b and 816c to an initial, or zero, count. Hence, the illustrated control circuit is conditioned to detect the movement of tape t when block of information 832 is reproduced.

When block of information 832 is reproduced, counter 816 functions in the manner described hereinabove in respect to the reproduction of block 831. Thus, when stop signal 835 is reached, the count attained by counter 816 represents the length of block 832. It is recalled that tape T is temporarily stopped once stop signal 835 is reproduced, thereby enabling the student to answer, or otherwise respond to, the block of information 832. If the student's answer is incorrect, it is necessary to reverse tape T such that block of information 833 on secondary track $t_2$ is reproduced. This function is performed when main control unit 10 applies a reverse drive signal to the tape reproducing apparatus and, in addition, a count-down binary "0" to input terminal 814. Thus, as tape T is reversed, the correspondng pulses produced by Schmidt trigger 811 now are transmitted through conditioned NAND gate 813 to decrement counter 816. It is recognized that counter 816 will be decremented to a count of zero when tape T has been reversed by an amount substantially equal to the amount by which it previously had been advanced. That is, when the initial portion of block 833 (aligned with the initial portion of block 832) is reached, counter 816 will exhibit a count of zero. This zero count supplies a binary "1" to each input of NAND gate 819, thereby triggering monostable multivibrator 820 to produce the aforementioned output pulse of predetermined duration at output terminal 821. This output pulse is equivalent to a stop signal, thereby halting further reverse movement of tape T, and then driving the tape in a forward direction such that block of information 833 on secondary track $t_2$ is reproduced.

Figure 3:
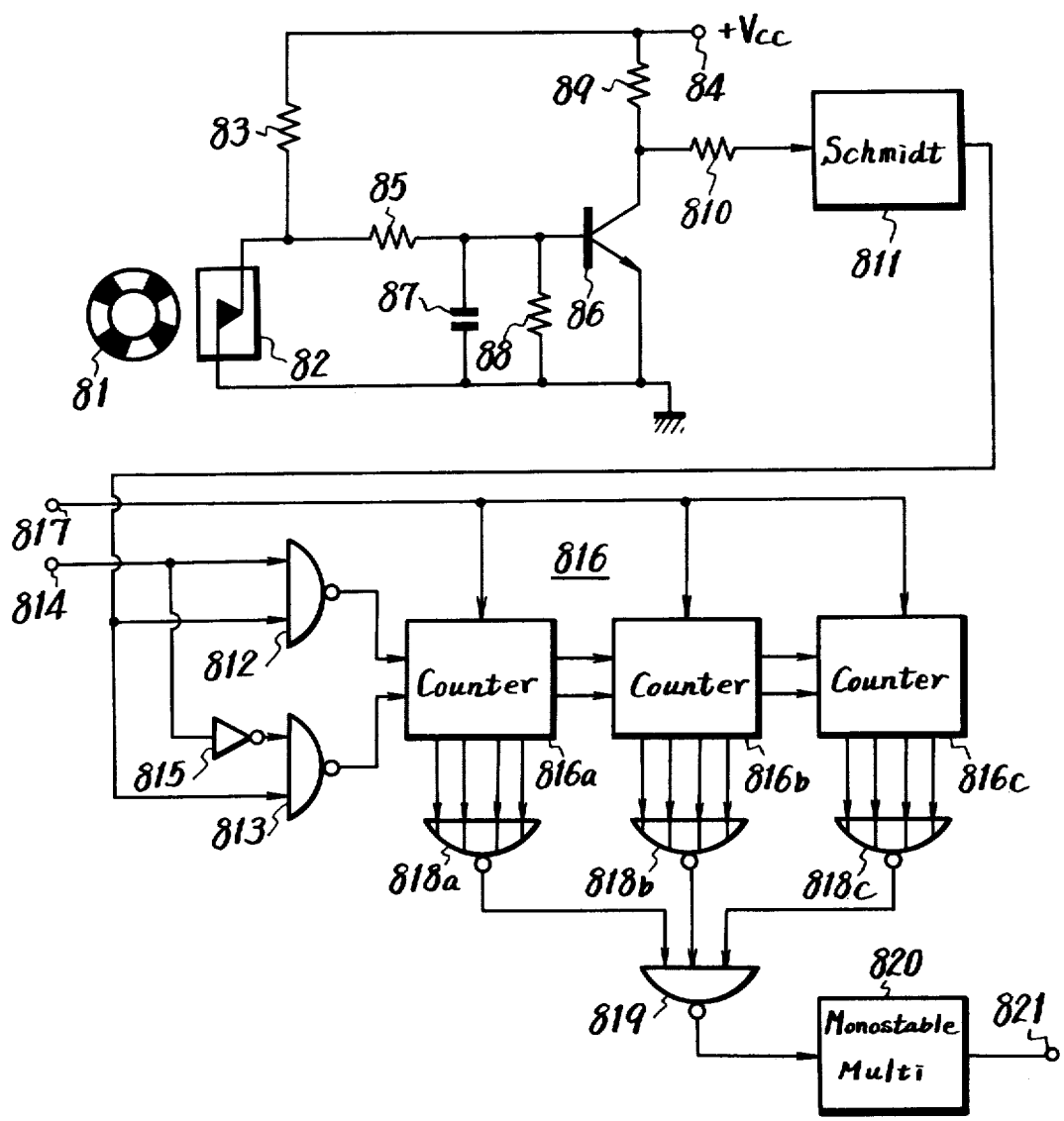
FIG. 3 is a schematic diagram showing a portion of the control apparatus used with the audio signal reproducing device in FIG. 1.

Thus it is seen that the control circuitry of FIG. 3 serves to accurately position tape T such that the selected blocks of information pre-recorded thereon are reproduced in accordance with the correctness of the student's response. It should be appreciated that the illustrated control circuitry is provided in associated with each of tape reproducing apparatus 8a, 8b, 8c and 8d. Thus, it is seen that the stop signals 835 recorded on tape T at each tape reproducing apparatus are sensed and transmitted to main control unit 10 thereby represent the relative advance of tape T, whereby main control unit 10 is capable of selectively controlling the further movement of the tape. The tape drive control signals produced by main control unit 10 are applied to the control circuity of FIG. 3.

In a preferred embodiment, video memory 5 is comprised of a main storage device whereat all of the possible frames of video picture information are stored and a plural channel buffer store having a number of channels at least equal to the number of stations, each channel being capable of storing a frame of video picture information. The main storage device 50 is a random access storage device schematically depicted in FIG. 5 and comprises a magnetic recording medium 51 adapted to be scanned by a playback disc 56. Preferably, the recording medium 51 is a magnetic sheet or card having multiple tracks recorded thereon, as will be explained in greater detail in respect to FIG. 6. Suffice it to say that a field of video information is recorded in each track such that a pair of tracks constitutes a frame of picture information.

The disc 56 is adapted to rotate about axis 58 and includes at least two pick-up transducers 52A and 52B. As disc 56 rotates, each transducer successively scans a pre-recorded track on magnetic card 51. Also, as card 51 is scanned, the card is moved axially to thereby enable adjacent tracks to be scanned in succession by transducers 52A and 52B.

As shown in FIG. 5, guides 53, 54 and 55 are provided to feed card 51 into proper semicircular relation about scanning disc 56. A stop 57 is provided to suitably determine the correct alignment of card 51 in the scanning mechanism.

As shown in FIG. 6, pairs of tracks $A_1$, $B_1$; $A_2$, $B_2$; $A_3$, $B_3$; . . . ; are recorded in parallel accross the surface of card 51. As one example, when card 51 is scanned by disc 56, transducer 52A scans track $A_1$ during one-half rotation of the disc and transducer 52B scans track $B_1$ during the second half rotation of the disc. Thus, during one complete rotation, a full frame of picture information is reproduced by transducers 52A and 52B. As a numerical example, 120 different frames of video picture information can be recorded on card 51. These frames may relate to instructional material to be learned by the students and, in addition, may include a frame to be displayed when an answer is correct and another frame to be displayed when an answer is incorrect.

Since main storage device 50 is a random access store, an address track 59 is recorded transversely of the video information tracks. Address signals are recorded in address track 59, each address signal being aligned with a frame of picture information so as to identify such information. Address track 59 is scanned by a separate reproducing head 60. Thus, as card 51 is driven axially of scanning disc 56, the successive address signals recorded in address track 59 are reproduced by head 60. Consequently, a predetermined, or addressed, frame of picture information can be accessed merely by comparing the address signals reproduced by head 60 with a selected address signal. In this regard, main control unit 10 may comprise a suitable comparator for comparing the address signals reproduced by tape reproducing apparatus 8a, 8b, 8c and 8d with the address signals reproduced by head 60. In this manner, the particular frame of picture information which is recorded, for example, in track $t_1$ on tape T is accessed and read out from main storage device 50.

A plural channel buffer store 500 included in video memory 5 is schematically depicted in FIG. 7. Preferably, buffer store 500 is comprised of a magnetic disc 501 having plural circular tracks $T_a$, $T_b$, $T_c$, $T_d$, $T_A$ and $T_B$ thereon. Each track is adapted to have a frame of picture information recorded thereon and reproduced therefrom. Accordingly, disc 501 is adapted to be operated upon by a magnetic disc recording/reproducing apparatus including recording/playback heads Ha, Hb, Hc, Hd, HA and HB. Each of these heads is aligned with a corresponding circular track such that, as disc 501 rotates, a recorded frame of picture information is continuously reproduced.

Buffer store 500 also includes recording selector switches 502 and reproducing selector switches 503. It may be appreciated that the number of circular tracks provided on disc 501 is equal to the number of stations (tracks $T_a$, $T_b$, $T_c$ and $T_d$) plus two additional tracks $T_A$ and $T_B$ for recording picture information to be displayed when correct and incorrect answers are provided, respectively. The number of recording switches included in recording selector switches 502 is equal to the number of tracks on disc 501; and the number of switches included in reproducing selector switches 503 is equal to the number of stations. As shown schematically, recording selector switches 502 are comprised of individually controlled switches $S_{Ra}$, $S_{Rb}$, $S_{Rc}$, $S_{Rd}$, $S_{RA}$ and $S_{RB}$. Associated with these switches are recording/playback change-over switches $S_a$, $S_b$, $S_c$, $S_d$, $S_A$ and $S_B$, respectively. Each recording/playback change-over switch is provided with a movable contact connected to an associated recording/reproducing head, with a first stationary contact R connected to a corresponding selector switch $S_{Ra}$ . . . , and with a second stationary contact P connected to the reproducing selector switches 503. The switching circuit 502 is adapted to be selectively controlled by main control unit 10 such that one of the selector switches $R_{Ra}$, $S_{Rb}$, $S_{Rc}$, $S_{Rd}$, $S_{RA}$ and $S_{RB}$ can be closed at any given time. Also, when a particular recording selector switch is closed, its associated recording/playback change-over switch is activated such that the movable contact of this switch engages its stationary contact R. Preferably, the remaining change-over switches are activated such that each movable contact engages its stationary contact P.

Each of the switches included in the reproducing selector switching circuit 503 preferably is a multi-selector switch having plural stationary contacts, such as the three illustrated stationary contacts, selectively engageable by a movable contact. Each movable contact is connected to an output terminal 504a, 504b, 504c and 504d, respectively, these output terminals being connected through switching circuit 7 to a corresponding station 1a, 1b, 1c and 1d, respectively.

The manner in which buffer store 500 cooperates with main storage 50 to transmit a selected video picture to television monitors 2a, 2b, 2c and 2d now will be described. Let it be assumed that tape reproducing apparatus 8a transmits audio information to station 1a which requires the video display of a particular frame of picture information. It is recalled that tape T is provided with a suitable picture information identifying signal, or address, which is reproduced and transmitted to main control unit 10. This transmitted address signal is compared with the address signals successively reproduced by head 60 from address track 59 on magnetic card 51. When the identified frame of picture information is accessed, this information is reproduced by transducers 52A and 52B in main storage device. At this time, main control unit 10 closes recording selector switch $S_{Ra}$ and activates change-over switch $S_a$ to its recording contact R. Consequently, the reproduced frame of picture information is transmitted from main storage device 50, through closed switch $S_{Ra}$ and through change-over switch $S_a$ to recording/reproducing head $H_a$ aligned with track $T_a$. As disc 501 makes one complete rotation, the addressed frame of picture information is recorded on track $T_a$.

Following this recording of the picture information in track $T_a$, various other frames of picture information can be addressed in main storage device 50 and recorded in selected tracks on disc 501 in the manner just described. Also, a frame of picture information corresponding to a picture which will be displayed in response to a correct answer is recorded in track $T_A$ and a similar frame of information corresponding to a picture which is to displayed in response to an incorrect answer is recorded in track $T_B$.

After the addressed frame of picture information is recorded in track $T_a$, main control unit 10 activates change-over switch $S_a$ to its playback contact P and activates reproducing selector switch $S_{Pa}$ to engage its movable contact with playback contact P of change-over switch $S_a$. Hence, the frame of information recorded in track $T_a$ now is reproduced by head $H_a$ and is supplied through change-over switch $S_a$ and reproducing selector switch $S_{Pa}$ to output terminal 504a. This reproduced frame of information then is transmitted through switching circuit 7 to television monitor 2a. The change-over switch $S_a$ and reproducing selector switch $S_{Pa}$ will remain in these positions until the student responds to, for example, the question prerecorded in block 832 by positioning light pen 4a at a selected location on the screen of television monitor 2a. If the student's response is a correct answer, main control unit 10 activates reproducing selector switch $S_{Pa}$ to position its movable contact so as to complete a circuit to change-over switch $S_A$. Also, change-over switch $S_A$ is closed to its playback contact P such that the frame of picture information representing the display of a picture indicative of a correct answer is reproduced from track $T_A$ by head $H_A$ and is transmitted through change-over switch $S_A$ and reproducing selector switch $S_{Pa}$ to switching circuit 7 and televison monitor 2a.

It is recalled that, following a correct answer, the next segment, or block, of explanatory audio information is reproduced and an associated video picture is displayed. Hence, the next picture is addressed in the manner described hereinabove, and the addressed frame of picture information is transmitted from main storage device 50 to recording selector switching circuit 502. At this time, recording selector switch $S_{Ra}$ again is closed and change-over switch $S_a$ is positioned at contact R. Consequently, the addressed frame of picture information is recorded in track $T_a$, as aforesaid. The aforedescribed operation then is repeated.

If the student's answer had been incorrect, main control unit 10 activates reproducing selector switch $S_{Pa}$ to position its movable contact in circuit with change-over switch $S_B$. In this position, the frame of picture information corresponding to the display associated with an incorrect answer is reproduced from track $T_B$ by head $H_B$ and transmitted through change-over switch $S_B$ and reproducing selector switch $S_{Pa}$ through switching circuit 7 to television monitor 2a. It is recalled that, following an incorrect answer, tape T is reversed such that segment, or block, of additional audio information 833 on secondary track $t_a$ is reproduced. If this additional information pertains to the video picture previously displayed, then main control unit 10 activates reproducing selector switch $S_{Pa}$ to a position in circuit with change-over switch $S_a$. Hence, the picture information in track $T_a$ again is reproduced by head $H_a$ and transmitted through change-over switch $S_a$ and reproducing selector $S_{Pa}$ through switching circuit 7 to television monitor 2a.

The foregoing description of the operation of the various switches associated with track $T_a$ and station $1_a$ is equally applicable to the remaining tracks and stations. Thus, it is seen that the selective recording and reproducing of video picture information for each station may be performed substantially independently. Main control unit 10 thus may include typical multiplexing circuitry so as to effect such substantially independent operation of the various switches. Hence, while video picture information is recorded in one track, the previously recorded picture information in the remaining tracks can be reproduced and transmitted to their associated stations.

Following a correct answer, the next frame of picture information must be addressed, accessed and transmitted from main storage device 50 to buffer store 500. The average time required to access a frame of picture information is approximately 1.5 seconds. However, during this interim, the display corresponding to an indication of a correct answer can be read out from buffer store 500 to the appropriate television monitor. Alternatively, an additional track may be provided on disc 501 having, for example, an "interlude" display recorded thereon. Then, during the interval required to access a new video picture fram main storage device 50, this interlude picture can be displayed.

The system illustrated in FIG. 1 may additionally be provided with a master station 13 provided with a master television monitor 14. An instructor may be located at master station 13 and, through switching circuit 7, can monitor any one of stations 1a, 1b, 1c and 1d. Hence, the instructor can observe the progress of selective students. Furthermore, if desired, a communication path may be established between the instructor at station 13 and any one of the students at stations 1a, 1b, 1c and 1d.

While the present invention has been particularly shown and described with reference to a preferred embodiment thereof, it should be readily apparent that various changes and modifications in form and details can be made by one of ordinary skill in the art without departing from the spirit and scope of the invention. Accordingly, it is intended that the appended claims be interpreted as including such changes and modifications.

What is claimed is:

1. A system for selectively supplying information requiring independent response to plural stations whereat operators provide said independent responses, said system returning further information to said stations as a function of each response, comprising:

a television monitor at each station for displaying video picture information;

manually operable responding means at each said station for producing said response when operated by said operator;

main storage means for storing a plurality of addressable frames of video picture signal information, each frame representing predetermined still video information;

buffer storage means having a plurality of storage channels corresponding to the number of said stations, each storage channel having a storage capacity to store a frame of video picture signal information;

first switch means intercoupled between said main storage means and said buffer storage means and selectively operable for transferring an addressed frame of video picture signal information to a selected channel in said buffer storage means;

second switch means intercoupled between said buffer storage means and said plurality of stations and selectively operable for transmitting selected frames of video picture signal information from said storage channels in said buffer storage means to corresponding ones of said stations so as to display on the television monitors at said stations still video picture information represented by the respective transmitted frames; and control means coupled to said main storage means and to said buffer storage means for controlling said main storage means in accordance with a produced response to address a selected frame of video picture signal information and to transmit the addressed frame to a particular storage channel in said buffer storage means as determined by the selective operation of said first switch means, and for controlling said buffer storage means to transmit the frames of video picture signal information stored in said respective storage channels to selected ones of said stations as determined by the selective operation of said second switch means.

2. The system of claim 1 wherein said buffer storage means comprises plural channel magnetic recording/reproducing apparatus for recording selected frames of video picture signal information in selected channels and for reproducing said recorded frames to display corresponding video picture information at particular stations.

3. The system of claim 1 further comprising separate audio signal reproducing apparatus at each station for reproducing from a record medium pre-recorded audio information associated with the video picture information then being displayed at said station, the operation of each said audio signal reproducing apparatus being controlled by said control means, said audio signal reproducing apparatus transmitting to said control means a control signal representing the relative advance of said record medium in said audio signal reproducing apparatus to enable said control means to selectively control the relative advance of said record medium.

4. The system of claim 3 wherein said audio signal reproducing apparatus comprises a magnetic tape reproducer and said record medium is magnetic tape; and wherein a video picture address signal is recorded on said magnetic tape in association with said recorded audio information, said magnetic tape reproducer transmitting to said control means the address of the particular frame of video picture signal information which is to be supplied by said main storage means to a selected storage channel of said buffer storage means for displaying the video picture information associated with said recorded audio information at said station.

5. The system of claim 1 wherein each said responding means comprises a light pen manually positionable by said operator at a location on the displayed video picture representative of said response; and means for transmitting to said control means an indication of said location of said light pen on said video picture.

6. The system of claim 5 further comprising separate audio signal reproducing apparatus at each station for reproducing from a record medium pre-recorded audio information associated with the video picture then being displayed at said station, at least a portion of said audio information eliciting the positioning by said operator of said light pen on said video picture, said control means being coupled to each said audio signal reproducing apparatus for controlling the reproduction of audio information as a function of the particular location of said light pen on said video picture.

7. The system of claim 6 wherein said record medium has a control signal recorded thereon following a portion of audio information for causing said control means to temporarily halt relative movement of said record medium while awaiting the selective positioning of said light pen by said operator; and further including record medium control means coupled to said control means for receiving a medium advance signal when said operator positions said light pen at a predetermined location as a response to thereby advance said record medium and for receiving a medium reverse signal when said operator positions said light pen at another location to thereby reverse said record medium.

8. The system of claim 7 wherein said record medium comprises a magnetic tape having first and second tracks, and said audio signal reproducing apparatus comprises a tape reproducer for normally reproducing audio information recorded in said first track and for repruoducing audio information recorded in said second track in the event that said tape is reversed because said operator positions said light pen at other than said predetermined location.

9. The system of claim 8 wherein said first track includes information representing a question the answer to which is represented by the positioning of said light pen on said video picture; and said second track includes information representing additional explanatory material and a further question the answer to which is represented by the positioning of said light pen on said video picture, said second track information being reproduced in the event that said answer to said first track question is incorrect.

10. The system of claim 7 further comprising character generator means coupled to each said televison monitor for producing a predetermined alphanumeric video display representing possible responses, said light pen being positionable at any location of said alphanumeric video display, but only a predetermined location being a correct response to thereby advance said record medium.

11. The system of claim 1 wherein said main storage means comprises a main storage medium having individually addressable locations whereat said frames of video picture signal information are stored; and further including locations whereat predetermined signals characterizing a response are stored, said predetermined response characterizing signals being transmitted through said selectively operated first switch means to predetermined channels in said buffer storage means for further transmission through said selectively operated second switch means to a station depending upon whether the response by said operator at said station is a predetermined response.

12. The system of claim 11 wherein said buffer storage means comprises a magnetic disc having a number of storage channels at least equal to the number of stations plus first and second response characterizing signal channels; signal recording means associated with each said channel to record thereon a frame of video picture signal information addressed from said main storage medium; and signal playback means associated with each said channel to selectively play back and transmit a frame of video picture signal information and a response characterizing signal to an associated station.

13. The system of claim 12 further comprising means at each said station for addressing a location in said main storage medium from which a frame of video picture signal information is transmitted to a channel in said buffer storage means associated with said station, said addressing being a function of whether the preceding response by said operator at said station is said predetermined response.

14. An audio-visual instruction method, comprising the steps of:
displaying one of a plurality of frames of still video pictures to one of plural students;
transmitting audible instructions from a record medium to said student, said instructions including material explanatory of said displayed picture and at least one question requiring a response by said student;
responding to said at least one question by selecting one of plural possible answers;
evaluating said answer to determine its correctness;
transmitting further audible instructions, including additional material explanatory of said displayed picture from said record medium to said student in the event that said answer is not correct; said further audible instructions including at least one question requiring a response by said student;
transmitting a new set of audible instructions from said record medium to said student in the event that said evaluated answer is correct, said new set of instructions including material explanatory of a new video picture;
reproducing an address pre-recorded on said record medium in association with said new set of audible instructions;
searching through said video store for a frame of video picture signal information identified by said address;
recording said addressed frame of video picture signal information in a particular channel of a buffer storage medium, said particular channel being associated with said one student; and
displaying the frame of video picture signal information recorded in said particular channel of said buffer storage medium.

15. The method of claim 14 wherein said step of responding to said question comprises positioning a light pen at a selectable location in overlying relation to said displayed video picture; and generating an indication of said location representing a corresponding one answer.

16. The method of claim 15 wherein said step of evaluating said answer comprises comparing said light pen location indication with an indication of a predetermined location corresponding to the correct answer.

17. The method of claim 14 wherein said buffer storage medium comprises a plural channel storage medium having a number of channels equal to the number of students plus at least two additional channels to store a frame of video picture signal information indicative of a correct answer and a frame of video picture signal information indicative of an incorrect answer; and further comprising the steps of displaying a selected one of the frames of video picture signal information recorded in said two additional channels depending upon the evaluation of the correctness of said answer by said student in response to a question.

18. The method of claim 14 wherein said step of transmitting audible instructions from a record medium to a student comprises advancing a magnetic tape to reproduce pre-recorded information from a first portion thereof and stopping said tape after said first portion has been reproduced to permit said student to respond thereto; and said step of transmitting further audible instructions comprises advancing said magnetic tape to reproduce pre-recorded further information from another portion thereof if said answer is not correct and stopping said tape after said other portion has been reproduced to permit said student to respond thereto.

19. The method of claim 18 wherein said other portion of magnetic tape is recorded on a track different from the track on which said first portion is recorded; and wherein said step of advancing said magnetic tape to reproduce said further information comprises reversing said magnetic tape by an amount equal to said other portion, and then advancing said magnetic tape by said amount while reproducing said further information from said other portion on said different track.

* * * * *